US012808740B2

(12) United States Patent
Vansweevelt et al.

(10) Patent No.: US 12,808,740 B2
(45) Date of Patent: Nov. 24, 2026

(54) METHOD FOR MANAGING A COMPRESSOR

(71) Applicant: ATLAS COPCO AIRPOWER, NAAMLOZE VENNOOTSCHAP, Wilrijk (BE)

(72) Inventors: Jan Vansweevelt, Wilrijk (BE); Joeri Ooms, Wilrijk (BE)

(73) Assignee: ATLAS COPCO AIRPOWER, NAAMLOZE VENNOOTSCHAP, Wilrijk (BE)

( * ) Notice: Subject to any disclaimer, the term of this patent is extended or adjusted under 35 U.S.C. 154(b) by 274 days.

(21) Appl. No.: 17/635,718

(22) PCT Filed: Oct. 29, 2020

(86) PCT No.: PCT/IB2020/060162

§ 371 (c)(1),
(2) Date: Feb. 16, 2022

(87) PCT Pub. No.: WO2021/090125

PCT Pub. Date: May 14, 2021

(65) Prior Publication Data

US 2022/0282724 A1 Sep. 8, 2022

(30) Foreign Application Priority Data

Nov. 4, 2019 (BE) .................................. 2019/5756

(51) Int. Cl.
*G01M 3/00* (2006.01)
*F04B 51/00* (2006.01)

(52) U.S. Cl.
CPC ............... *G01M 3/00* (2013.01); *F04B 51/00* (2013.01)

(58) Field of Classification Search
CPC ............ G01M 3/00; G01M 3/40; F04B 51/00
See application file for complete search history.

(56) References Cited

U.S. PATENT DOCUMENTS

| | | | | |
|---|---|---|---|---|
| 5,629,931 | A | 5/1997 | Kausel | |
| 9,860,361 | B1 | 1/2018 | Hall et al. | |
| 2006/0146469 | A1 * | 7/2006 | Heagerty ................ | H04Q 9/00 361/115 |
| 2011/0071774 | A1 | 3/2011 | Fonda et al. | |
| 2014/0096608 | A1 | 4/2014 | Themm et al. | |

(Continued)

FOREIGN PATENT DOCUMENTS

| | | | |
|---|---|---|---|
| CN | 106050663 | B | 10/2016 |
| CN | 108916019 | A | 11/2018 |

(Continued)

OTHER PUBLICATIONS

Machine Translation of JP 2005339195 (Year: 2005).*

(Continued)

*Primary Examiner* — Nathaniel J Kolb
(74) *Attorney, Agent, or Firm* — Workman Nydegger

(57) ABSTRACT

A compressor configured for compressing and supplying a gas to a pneumatic network includes one or more pneumatic consumers, and a control unit configured to manage the compressor. The compressor further includes a wireless coupling unit configured to manage the compressor wirelessly through the control unit.

16 Claims, 2 Drawing Sheets

(56) References Cited

U.S. PATENT DOCUMENTS

| | | | | |
|---|---|---|---|---|
| 2014/0191855 | A1 | 7/2014 | Kim et al. | |
| 2016/0169572 | A1* | 6/2016 | Noboa | F25B 13/00 62/115 |
| 2017/0016800 | A1* | 1/2017 | Van Gorp | G01M 3/40 |
| 2018/0128705 | A1 | 5/2018 | Wetherill et al. | |
| 2019/0257589 | A1 | 8/2019 | Rosales et al. | |

FOREIGN PATENT DOCUMENTS

| | | | | | |
|---|---|---|---|---|---|
| CN | 109209848 | A | * | 1/2019 | F04B 49/08 |
| CN | 209278094 | U | † | 8/2019 | |
| CN | 209324634 | U | | 8/2019 | |
| CN | 209510608 | U | † | 10/2019 | |
| DE | 102004059288 | A1 | | 6/2006 | |
| EP | 1995140 | A2 | | 11/2008 | |
| EP | 2913649 | A1 | | 9/2015 | |
| EP | 2993832 | A1 | | 9/2016 | |
| EP | 3067680 | A1 | | 9/2016 | |
| EP | 2746744 | B1 | * | 9/2017 | G01M 3/40 |
| JP | 2005339195 | A | * | 12/2005 | |
| JP | 2011200097 | A | | 10/2011 | |
| JP | 2016111540 | A | | 6/2016 | |
| JP | 2017198098 | A | | 11/2017 | |
| KR | 20060092279 | A | | 8/2006 | |
| WO | 2012161525 | A2 | | 11/2012 | |
| WO | 2019013316 | A1 | | 1/2019 | |

OTHER PUBLICATIONS

Machine translation of CN109209848 A (Year: 2019).*

"Introduction to the LONworks system," Echelon Corporation, part 1 (Year: 1999).*

"Introduction to the LONworks system," Echelon Corporation, part 2 (Year: 1999).*

International Search Report and Written Opinion in corresponding PCT Application No. PCT/IB2020/060162, dated Jan. 27, 2021.

BE Search Report in corresponding BE Application No. 201905756, dated May 4, 2020.

* cited by examiner
† cited by third party

METHOD FOR MANAGING A COMPRESSOR

FIELD OF THE INVENTION

The invention is situated in the field of compressors for compressing and supplying a gas to a pneumatic network, and more specifically in the management of such a compressor.

BACKGROUND OF THE INVENTION

It is known that compressors are used for compressing gas in one or more stages. This compressed gas is supplied to one or more pneumatic consumers through a pneumatic network.

It is also known that a plurality of parameters determine the choice of the compressor. These parameters may be of a technical nature, such as, for instance, power, pressure ratio and/or start-up time. Other parameters may include economic parameters such as investment and/or maintenance costs, or even environmental requirements, such as energy-efficiency and/or noise requirements during operation. Furthermore, the type of pneumatic consumers and the respective intended applications will influence the choice of the compressor. Finally, the applied pneumatic network in terms of size and capacity will also influence the choice.

It is therefore clear that the choice of a compressor for use and installation at a specific location, such as in an industrial environment, is made on the basis of a unique combination of different parameters. As a result, each situation will be different and therefore requires a specific approach in terms of installation, deployment requirements and maintenance.

During operation, a number of preconditions can also be changed that influence the proper operation of the compressor. Examples include the changing of the pneumatic consumers as well as the ambient temperature of both the room in which the compressor is installed and the connected pneumatic network.

To ensure proper operation of the compressor at all times, an operator will attempt to manage and check the operating parameters. It is known that the operator has a control panel on the compressor for this purpose.

However, different drawbacks can be identified. Firstly, the control panel may be limited to a few elementary basic functions that allow the operator to perform only minor actions.

Secondly, even when a plurality of functions are available, this plurality of functions just creates a cluttered management system on a generally user-unfriendly control panel. This is because usually the same keys are used for different functions, and/or because unique key combinations are used for specific manipulations. In addition, abbreviations are used to visualize different parameters in order to visualize as much information as possible on the control panel. As a consequence, the operator must not only be highly technically skilled, but also have a thorough knowledge of the manner in which various parameters may be displayed, controlled and/or monitored.

Finally, for reasons of optimal space utilization, a compressor is usually set up in a separate locality, for instance in a plant room. In addition, in this plant room the compressor is installed at the location that usually is not easily accessible. This also causes nuisance to the operator because the control panel is not easy to operate.

Consequently, there is a need for a system and method to efficiently operate the compressor to be able to quickly respond to changing preconditions that adversely influence the compressor performance.

SUMMARY OF THE INVENTION

An objective of this invention is to provide a way to optimally and efficiently manage a compressor.

This objective is achieved, according to an initial aspect of the invention, by providing a compressor configured for compressing and delivering a gas comprising a control unit configured for managing the compressor, characterized in that the compressor further comprises a wireless coupling unit configured to wirelessly manage the compressor.

The compressor is configured to compress or pressurize gas via, for instance, one or more stages. The pressurized or compressed gas can then further be supplied to pneumatic consumers via a pneumatic consumer network. These connected pneumatic consumers then use the compressed gas for specific applications. As a rule, the consumers will be located in other rooms than the compressor, but it will be obvious that this is not necessary. It is also clear that in a simple configuration, a single pneumatic consumer may be present, where the compressor and the consumer may be in close proximity to each other. In such a case, the pneumatic network comprises one single line. Furthermore, it should be understood that a pneumatic consumer may also comprise the connection coupling to the pneumatic consumer network. Since this connection coupling is suitable for connecting a consumer, this connection coupling may be considered the consumer instead of any connected device.

The compressor further includes a control unit. This control unit is configured for managing the compressor. Management means that a user can actuate, control, monitor, set and/or verify the compressor operating parameters or conditions, or any other manipulation to influence the compressor performance.

The control unit may be a simple on and off button, possibly combined with analogue keypads. On the other hand, this may also be an extensive digital control panel, or possibly a combination of analog and digital control. It should therefore be understood that the control unit enables the operation or management of the compressor as is known in the state-of-the-art.

Furthermore, the compressor operating parameters to be managed are, among other things, an operational status of the compressor, a gas pressure, a lubricant pressure, a refrigerant pressure, a gas pressure ratio relative to an ambient pressure, an electric current absorbed, an rpm, a temperature, a pressure drop, an electrical voltage, a power, a humidity, a level, and/or a compressor specification.

If the compressor is driven by an electric motor, the absorbed current of this electric motor is an operating parameter. In this configuration, the electric motor is then regarded as part of the compressor. Furthermore, the electrical voltage is also an operating parameter.

In addition, a frequency converter may be used to drive the electric motor. The operating parameter may then be the input voltage and/or current of the frequency converter.

If the compressor compresses the gas by means of rotating compressor elements, as for instance in a screw compressor, the rpm and/or rpm values of the rotating elements are also considered operating parameters. The compressor element may also operate orbiting, as in a scroll compressor, or reciprocating, as in a piston compressor. Then the rpm is indicative of the movement of one or several of these compressor elements. If the compressor is driven by an internal combustion engine, this may also be the rpm of the internal combustion engine drive. Furthermore, this may also be the rpm of the electric motor when such a drive is used.

The temperature is, for instance, the ambient temperature, the temperature of the compressed gas, and/or the temperature of one or more compressor components. The temperature may also be a temperature of a coolant and/or lubricant.

The power is, for instance, the absorbed electrical or mechanical power. The power may also be the absorbed power of the frequency converter, if used.

The humidity is, for instance, the air humidity of the compressor environment.

The level is, for instance, the oil level when it involves an oil-lubricated compressor.

A specification is, for instance, a year of construction and/or of installation of the compressor, a type, a serial number, a date of most recent maintenance, a maintenance interval, or any other data that may specify and/or identify the compressor.

If available, an activity of one or more pneumatic consumers can also be recorded as a parameter. However, it should be understood that this is not a direct operating parameter of the compressor itself.

The compressor further comprises a wireless coupling unit. This wireless coupling unit is configured to wirelessly manage the compressor. In other words, the wireless coupling unit allows management of the operating parameters, including inspecting, modifying, verifying, controlling, monitoring and/or setting, or any other manipulation that may influence the compressor operation. Wireless management can be performed because the wireless coupling unit controls the compressor control unit, or because the wireless coupling unit autonomously manages the compressor, that is, takes over the control unit functions, or possibly supplements those.

An advantage is that the compressor can be managed or controlled wirelessly by a manager or a user. The wireless coupling unit therefore caters for the disadvantages listed above in the way compressors are managed according to the state-of-the-art. Therefore, a manager or user does not have to be in the immediate vicinity of the compressor. That way dangerous situations may be avoided, for instance when other operational and/or running machines are located near the compressor.

Another advantage is that management is not limited to the functionality of a control panel, if any, but that the functionalities may be extended. Such extension is then limited only by the specifications of the user device. However, these specifications are not bound to the compressor itself, to its location, and/or to the preconditions such as, for instance, temperature and humidity, which means greater flexibility and more management possibilities.

According to an embodiment of the invention, the wireless coupling unit is configured to manage the compressor wirelessly through a wireless protocol. This protocol may be a specific customized protocol, or for instance a common protocol such as Wi-Fi, Bluetooth, Zigbee, Narrowband-IoT, LTE-CAT M, DASH7, or any other communication protocol for wireless communication.

According to an embodiment of the invention, the control unit includes an operating unit configured for local compressor management.

In other words, in addition to and as an alternative or addition, the compressor may also be managed using a control unit. Such a control unit, which is mounted on the compressor or connected directly and hardwired, may for instance comprise several basic functions, such as disconnecting the compressor. An advantage is that the user or manager may intervene in the event of a potentially harmful situation at a moment when the wireless connection is temporarily unavailable.

According to a second aspect of the invention, a computer-implemented method is provided for managing the compressor according to the first aspect of the invention by the user through a user device.

In other words, the computer-implemented method comprises functionalities for controlling, modifying or managing in any other way the compressor operating parameters. Management is performed by a user through a user device on which the computer-implemented method is implemented. User may also be defined as manager.

According to a preferred embodiment, when the compressor is connected to a diplomatic network, the method further comprises the steps of:

detecting when one or more pneumatic consumers are inactive for an inactive time period; and recording a compressor energy consumption during the inactive time period; and identifying a leak in the pneumatic network based on energy consumption, and reporting the leak, if identified.

As mentioned above, it should be understood that a pneumatic consumer may also include a coupling connection on the pneumatic consumer network. Since this connection coupling is suitable for connecting a consumer, this connection coupling may be considered the consumer instead of any connected device.

The one or more pneumatic consumers may, for instance, be equipped with a module so that it can be automatically detected when they are active/operational or inactive/non-operational.

Alternatively, the inactive time period may be a recurring time period derived from a compressor consumption profile. The consumer profile is then analyzed and on this basis it is determined when the pneumatic consumers are not operational and so do not absorb compressed gas from the pneumatic network. For instance, the analysis may be made by using artificial intelligence configured to perform such analysis.

According to a preferred embodiment, the inactive time period can also be detected by specifying start and/or stop times when the pneumatic consumers are inactive. This detection method leaves the user in control of the computer-implemented method, which increases the accuracy.

The inactive period, whether recurring or not, may for instance be a period during the night, during weekends, and/or during holiday periods.

In addition, the compressor's energy consumption is recorded during the inactive time period. Since a compressor is usually set to maintain a predefined pressure in the pneumatic network, the compressor will need to increase the pressure, if necessary, when it falls below a certain limit value. Such a situation will occur when the connections in the pneumatic network do not have ideal seals. There may also be a leak or leakage in the network. Finally, the connected consumers themselves may be a cause of such a leak. It should therefore be understood that a leakage may be either a single leakage, a total of leakages, or a total of poorly installed seals, or any other cause of a pressure drop in the pneumatic network.

Finally, the leakage is identified or determined on the basis of the recorded energy consumption. In other words, as the energy consumption has been recorded during the inactive period, it can be determined whether leakage occurs in the pneumatic network. This identification can then be reported to the user.

According to an embodiment, the computer-implemented procedure further comprises the steps of:

determining a leakage weight based on energy consumption, the inactive time period, and/or the one or more pneumatic consumers; and reporting the weight and/or the energy consumption.

The leakage weight expresses the significance or the importance of the leakage. If, for instance, a minor energy consumption is measured relative to a long inactive time period, the weight will be lower compared to a contrary situation, which is, a high energy consumption measured during a short inactive time period. Furthermore, the number of pneumatic consumers may also be reckoned with, as well as the size and area of the pneumatic network.

In addition, the weight, possibly together with the energy consumption, may be reported to the user. The reported energy consumption can be expressed in common physical units, such as kilowatt hours, kWh, or, for instance, in economic units, such as euro, taking into account the cost price per kWh.

That will give the user an insight into the possible necessity to take action in the event of leakage, both on the basis of the weight as well as on the basis of the energy losses and the connected financial expenses if no action is taken.

For instance, reporting may be automated if the critical value for the weight and/or the energy consumption is exceeded.

According to an embodiment, the computer-implemented procedure further comprises the steps of:

making a sound recording in an environment of the compressor through a microphone of the user device;

determining a belt tension of a compressor drive belt on the basis of the sound recording; and reporting the belt tension.

The computer-implemented method may also determine the belt tension of a compressor drive belt, if applicable, on the basis of sound recording. For that purpose, the user device microphone is used to make a sound recording.

The belt tension can be determined, when the compressor is inactive, by striking the belt with, for instance, an elongated object such as a screwdriver. The response of this strike is then recorded. The response is a change in air pressure which can be detected as sound by the microphone of the user device. The belt tension can then be determined based on this response. Since the compressor specifications can also be consulted as operating parameters, the belt tension can further be determined by comparing the belt drive type with the response. The belt tension then follows from that.

According to an embodiment, the computer-implemented procedure further comprises the steps of:

determining whether the belt tension lies within a predefined compressor operating area; and reporting when the belt tension is outside the operating area.

The predefined operating area is determined by the compressor type which can be consulted as operating parameter. Based on this type, it can then be determined what the preferred belt tension value is. For instance, the preferred value may be a value stated by the compressor manufacturer. The operating area then equals the preferred value, possibly complemented by a permitted deviation from that value. The operating area can then have an upper and lower limit. For the compressor to function optimally, the belt tension should be within the operating area. Any deviation may be reported to the user in such a way that the user is made aware that action must be taken. An action may, for instance, include the retensioning of the belt and/or performing a complete servicing procedure.

According to an embodiment of the invention, the computer-implemented procedure further includes the steps of:

detecting an irregularity of the compressor based on the operating parameters, and reporting the irregularity.

Apart from or in addition to the belt tension, any other irregularity may also be detected. The detection is based on an analysis of the operating parameters. An irregularity may, for instance, be directly related to the compressor, such as a too high absorbed current, a too low pressure, and/or a deviating pressure ratio. In addition, an irregularity may also be indirectly related to the compressor, such as, for instance, a deviating electrical supply voltage, a deviating ambient temperature, and/or a deviating humidity level.

When an irregularity is detected, it is reported to the user. The user then is aware of the nature of the irregularity, possibly supplemented by a list of operating parameters which show on what basis it has been concluded that an irregularity is occurring. On this basis, it can be determined what the appropriate action is to be taken.

According to an embodiment, the computer-implemented procedure further comprises the steps of:

reporting a service based on the irregularity detected; and/or reporting of a replacement part list based on the irregularity detected; and/or reporting a service interval based on the irregularity detected.

The user may also automatically receive proposals for what action is considered to the be most appropriate if an irregularity is detected.

A proposed or reported action would then be, for instance, a service action such as maintenance, a replacement parts list containing the parts necessary to remedy the irregularity, a new maintenance interval, or any other action that could remedy the irregularity, or, where appropriate, reduce its impact on a harmful compressor operation.

According to an embodiment, the computer-implemented procedure further comprises the steps of:

consulting a compressor power consumption for an active period of time; and/or consulting a parts list of the compressor; and/or consulting a compressor instruction and/or maintenance guide; and/or consulting a compressor manifold identification.

The user may also use the user device to simply access relevant data and information for optimum compressor management. The user may for instance consult the energy consumption during a time period. That may provide an insight in, for instance, the related costs. Furthermore, any consumption drift over longer time periods may be detected. The user may also consult a compressor parts list, an instruction and/or maintenance guide, or a distributor identification.

According to a third aspect of the invention, a computer program is provided with computer-executable instructions for carrying out the method according to the second aspect, when this program is executed on a computer.

According to a fourth aspect of the invention, a computer-readable storage means is provided containing the computer program is provided according to the third aspect.

According to a fifth aspect of the invention, a user device is provided, configured to communicate wirelessly with one or more other devices, characterized in that the user device is configured to manage the compressor according to the first aspect through the method according to the second aspect of the invention.

For instance, the user device may be a device that is only configured to manage the compressor. Furthermore, according to an embodiment, the user device may include one of the group of a smartphone, a tablet, a computer, a laptop, or a different device configured to communicate wirelessly with another device.

Furthermore, according to an embodiment of the invention, the user device may be configured to communicate with an external network.

The remote network may be, for instance, a local network, such as a corporate network, or the internet.

This means the user device is a computer, either or not mobile, and includes the computer-implemented method for managing the compressor.

The computer-implemented process may, for instance, be downloaded and installed through the remote network and installed on it. In addition, over the external network, an update may be performed by the manufacturer at certain times. This update may then increase the accuracy of the computer-implemented method in order to optimize the compressor management.

Alternatively, the user device may be a custom-made mobile device that implements the computer-implemented method and can be made available as a kit together with the compressor.

BRIEF DESCRIPTION OF THE DRAWINGS

The invention will be explained in more detail below using the drawings, wherein.

DETAILED DESCRIPTION OF THE INVENTION

Figure 1:
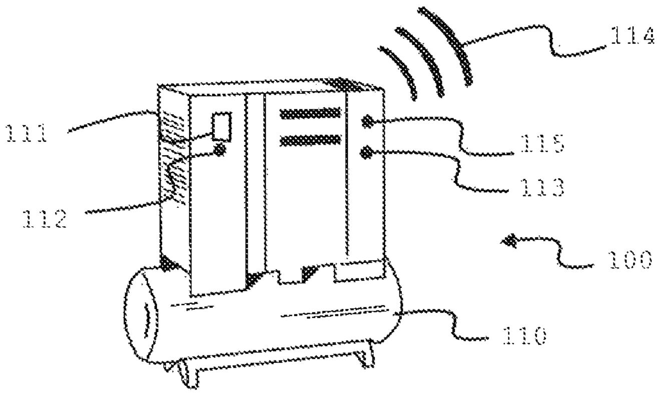
FIG. 1 a compressor illustrates comprising a wireless coupling unit configured to wirelessly manage the compressor according to an embodiment of the invention.

FIG. 1 illustrates a compressor 100 according to an illustrative embodiment of the invention. The compressor 100 comprises a control panel 111 for local operation of the compressor. The compressor 100 also comprises an emergency button 112 and a storage or buffer tank 110 for storing compressed gas. It should therefore be understood that the illustrated compressor 100 is a compressor as known in the state-of-the-art. It should therefore further be understood that this illustration does not imply any restriction, but that the compressor according to the invention may have a different embodiment or design, with other components present or absent, such as a compressor without a local control panel 111 and/or a storage vessel 110.

The compressor 100 also comprises a control unit 115. This control unit 115 is configured to manage the compressor 100. Managing means that a user can inspect, control, monitor, set up and/or verify the compressor 100 operating parameters or states 100, or perform any other manipulation to influence the compressor operation 100. The compressor 100 may then be further coupled with the operating panel 111 in such a way that the control unit 100 takes over the operation of the control panel 111. Conversely, the operating panel 111 can communicate the instructions received from a user to the control unit 100 in such a way that the control unit 115 carries out these instructions.

Figure 2:
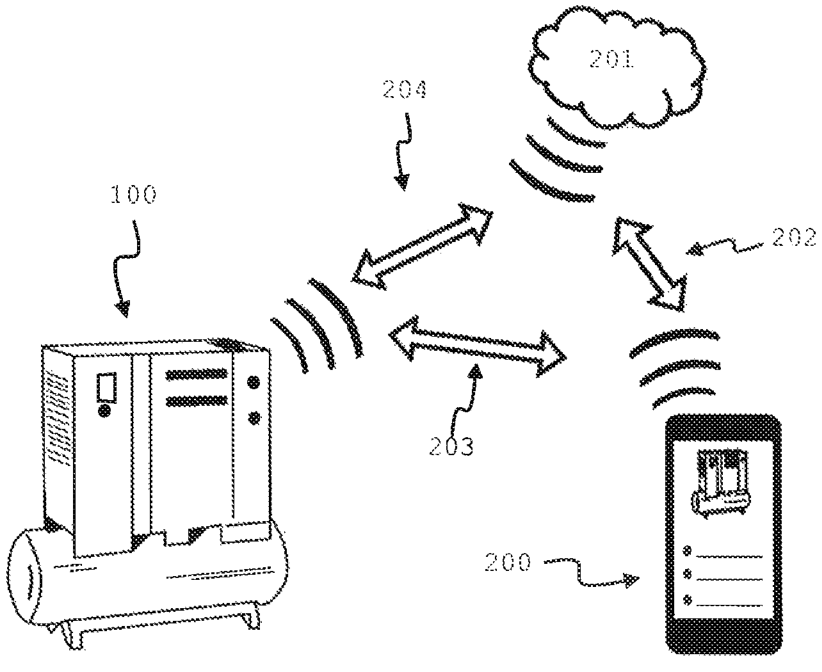
FIG. 2 a compressor, a user device configured to wirelessly manage the compressor, and an external network illustrates according to an embodiment of the invention.

According to the invention, the compressor 100 comprises a wireless coupling unit 113 configured to communicate 114 wirelessly with other devices. FIG. 2 further illustrates a wireless communication system. FIG. 2 illustrates the compressor 100 of FIG. 1, together with a user device 200 and an external network 200. The compressor 100 can then communicate 203 with the user device 200. In addition, the compressor 100 can also communicate 204 with an external network 201, such as the internet or a corporate network. Communication 204 then takes place, for instance, through a router or other device capable of communicating 204 with an external network 201. In addition, the user device 200 can also communicate 202 with the external network 201. This allows the communication of the compressor 100 instead of communicating 204 directly with the external network 201, to first communicate 203 with the user device 200, which in turn communicates 202 with the external network 201. This allows the communication of the compressor 100 to the external network 201 to take place indirectly.

Figure 3:
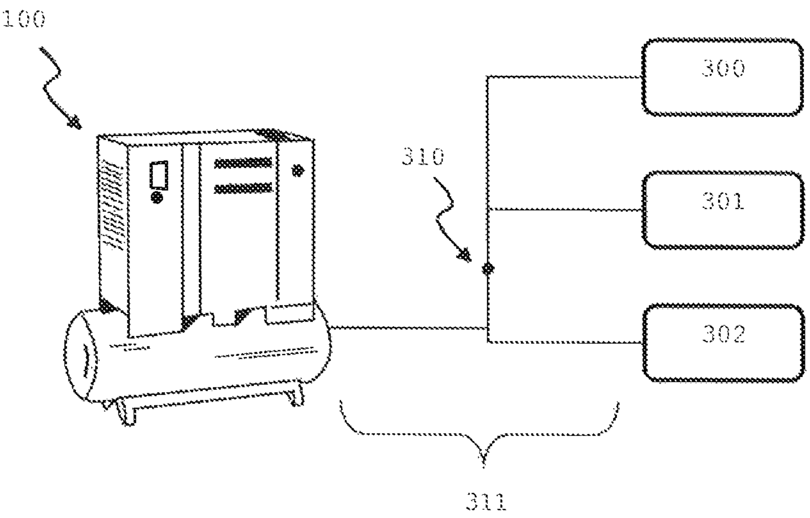
FIG. 3 a compressor, a pneumatic network, and pneumatic consumers connected to the pneumatic network illustrates according to an embodiments of the invention.

The compressor 100 is configured to deliver pressurized or compressed gas to one or more consumers via a pneumatic network. This is further illustrated in FIG. 3, in which the schematic network 311 illustrates a pneumatic network. To this 311, several consumers 300-302 are connected. It should further be understood that also only one consumer 300 may be connected, wherein the pneumatic network 311 then only comprises one single line. The pneumatic network 311 may be a vast network distributed over a company site. The compressor 100 will then be located in a different physical location than the various consumers 300-302, wherein the consumers 300-302 may also be each located in a different physical location relative to each other.

Figure 4:
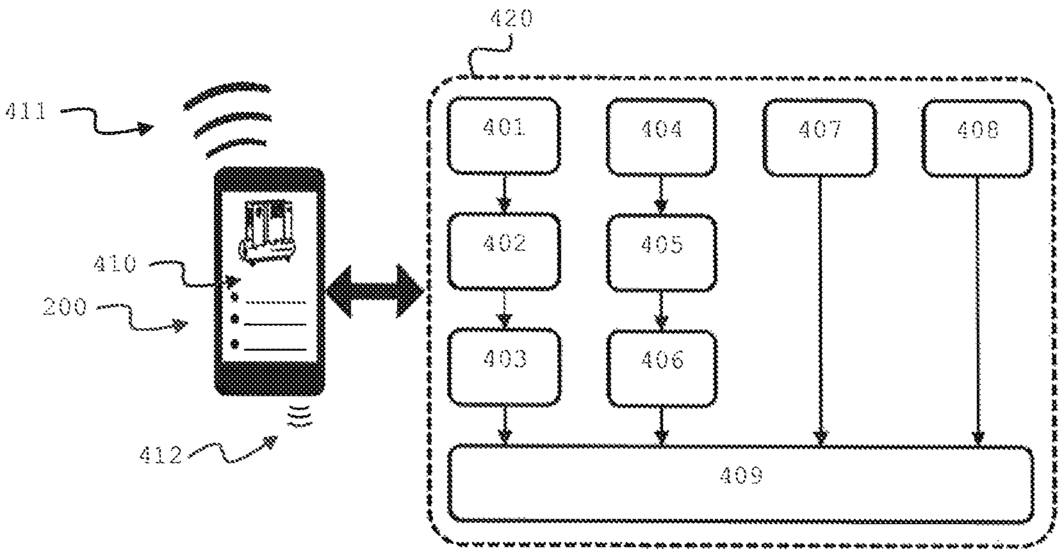
FIG. 4 schematic steps performed by a user device to manage a compressor illustrates according to an embodiment of the invention.

A leakage may be present in the pneumatic network 311, illustrated by leakage 310 which can be detected by the computer-implemented method of the invention. This detection method will be further illustrated with reference to FIG. 4.

FIG. 4 again illustrates the user device 200 along with steps 401-409 that the computer-implemented method 420 may perform to manage the compressor 100. These steps 401-409 may be performed simultaneously or separately. This depends, among other things, on the capabilities of the user device 200 and/or the user preferences that are responsible for managing the compressor 100.

For performing these steps 401-409, the user device 200 communicates 203 with the compressor 100, requesting and exchanging a set of operating parameters. These operating parameters include, for instance, an operational status of the compressor 100, a gas pressure, a pressure ratio of the gas to an ambient pressure, an absorbed electric current, a flow rate in the pneumatic network 311, an rpm, a temperature, a pressure drop, a voltage, a power, a humidity, a level, a specification of the compressor 100, and if available, an activity of one or more pneumatic consumers 300-302.

Communication 203 between the compressor 100 and the user device 200 can be performed through a secure or encrypted connection. This may for instance take place on the basis of a unique serial number of the compressor 100 together with a code specified by the compressor manufacturer 100 in order to access the wireless coupling unit 113 in order to manage the compressor 100.

The operating parameters can be called up as a batch, individually, or according to a certain limited list according to a certain frequency of moments in time. In other words, not all operating parameters have to be requested by the user device. This depends on the subsequent steps in the computer-implemented method 420 and, more in particular, on the specific analysis to be performed. The operating parameters may also be called up at predetermined times or monitored continuously.

An initial analysis is the identification of a possible leakage 310 in the pneumatic network 310. In a first step, it will be detected 401 whether users 300-302 are inactive. This can be detected 401 by means of direct communication with consumers 300-302, by analyzing the consumer profile of the compressor 100, or manually indicated by a user in the user device 200. During this inactive period, the compressor 100 energy consumption is recorded. A leakage is then identified based on energy consumption and reported 409 to the user. This report is then shown on a display 410 of the user device 200.

Additionally, weight may also be assigned or determined 403 for the leakage 310. If the leakage 310 is critical, for instance in terms of economic damage, the user will receive a report 409 of the determined 403 weight and the energy consumption.

A second analysis includes determining the belt tension of a belt transmission when the compressor 100 is provided with such belt transmission. For this purpose, the user device 200 makes a sound recording through the microphone 412. The user will lightly strike to the belt using an elongated object and measure 404 the response. Then, based on this response, the belt tension 405 is determined. This belt tension is then reported 409 to the user on the display 410.

Preferably, in the second analysis it is also determined 406 whether the belt tension is tolerable, i.e. within limits within which the belt transmission operates optimally. This can be deduced because the user device 200 has specifications available for the compressor 100 or can retrieve these through the operating parameters. This may then be further reported 409 to the user.

A third analysis involves the detection 407 of a compressor 100 irregularity. This may be done by analyzing the compressor 100 operating parameters. When anomalies occur in one of the parameters, such as a too high temperature, or when a drift is detected over a time period, such as a too quickly dropping level, an irregularity can be detected 407 This is then reported 409 to the user.

Reporting 409 may further comprise reporting 409 of a service, reporting 409 of a replacement parts list, or reporting 409 of a maintenance interval, each based on the detected 407 irregularity. This reporting 409 may further take place through communication 202 with the external network 201 while information may be requested, for instance from the compressor 100 manufacturer.

The computer-implemented method 420 may also include consulting 408 compressor 100 documentation. This documentation is, for instance, a compressor 100 energy consumption over a certain time period, for instance measured over a month, a compressor 100 instruction and/or maintenance guide, a compressor 100 manifold identification, or any other documentation relevant to a compressor 100 manager. This documentation may, for instance, be requested through the external network 201 in such a way that this documentation does not have to be stored on the user device 100. Another advantage is that this documentation can be updated, if required, by the compressor 100 manufacturer through the external network 201.

The present invention relates to a compressor in which the operation and application can be reversed for generating a vacuum, such as in the case of a vacuum pump. Then the operation is the same as for a compressor, wherein the application for the consumers is not on the discharge side, but on the suction side. In other words, it should be understood that the invention also concerns vacuum pumps, wherein then the operating parameters of the vacuum pump are requested.

It should also be understood that the present invention may also be applied to expanders or gas turbines, in which case the operating parameters of the expander or gas turbine are requested.

This invention is by no means limited to the embodiments described as examples and shown in the figures, but such a compressor, user device and computer-implemented method according to the invention can be realized in different versions without going beyond the scope of the invention.

The invention claimed is:

1. A compressor configured to compress and supply a gas to a pneumatic network comprising:

a control unit that is hardwired to the compressor; and a wireless coupling unit for communicating with a user device over a network, said user device configured to manage the compressor wirelessly through the wireless coupling unit by managing compressor operating parameters, including at least one of inspecting, modifying, verifying, controlling, monitoring, or setting, and wherein the user device and the control unit are each configured to manage the compressor by managing said compressor operating parameters including said at least one of inspecting, modifying, verifying, controlling, monitoring, or setting, wherein said user device enables said compressor operating parameters to be managed by a remote user utilizing the user device and situated at a location remote from said compressor, and wherein said control unit enables a local user situated in proximity to said compressor to intervene in compressor management by utilizing the control unit hardwired to the compressor to manage said compressor operating parameters without using said user device and wireless coupling unit at a moment when a network connection to the wireless coupling unit is unavailable, wherein the control unit is configured to take over operation of the compressor from the user device responsive to an instruction being received at the control unit, and wherein the user device is configured to take over operation of the compressor from the control unit responsive to an instruction being received at the user device, wherein the control unit is configured to determine a severity of a leakage in the pneumatic network, wherein the severity of the leakage is determined based on a measure of energy consumption of the compressor and a length of an inactive time period of the compressor, a number of the one or more pneumatic consumers, and a size and area of the pneumatic network defined by the one or more pneumatic consumers, wherein the compressor is configured to connect to the pneumatic network comprising the one or more pneumatic consumers, wherein the control unit is configured to record the compressor energy consumption during an inactive time period of one or more pneumatic consumers, wherein at least one of the severity of the leakage or the energy consumption over the pneumatic network is configured to be reported on a display connected to at least one of the user device and the control unit.

2. The compressor according to claim 1, wherein the control unit is configured to manage the compressor by checking one or more compressor operating parameters, the operating parameters comprising at least one of:

an operational status of the compressor;

a gas pressure;

a lubricant pressure;

a refrigerant pressure, a pressure ratio of the gas to an ambient pressure;

an absorbed electrical current;

an rpm;

a temperature;

a pressure drop;

an electrical voltage, a power;

a humidity;

a level; and a compressor specification.

3. The compressor according to claim 1, wherein the wireless coupling unit is configured to manage the compressor wirelessly through a wireless protocol.

4. The compressor according to claim 3, wherein the wireless protocol comprises one of the group of: Wi-Fi, Bluetooth, Zigbee, Narrowband-IoT, LTE-CAT M, and DASH7.

5. The compressor according to claim 1, wherein the control unit is configured to manage the compressor locally.

6. The compressor according to claim 1, wherein the compressor is configured to communicate with the user device through a secure or encrypted connection.

7. A computer-implemented method for managing a compressor including a control unit that is hardwired to the compressor, and a wireless coupling unit for communicating with a user device over a network, said user device configured to manage the compressor wirelessly through the wireless coupling unit by managing compressor operating parameters, including at least one of inspecting, modifying, verifying, controlling, monitoring, or setting and wherein the user device and the control unit are each configured to manage the compressor by managing said compressor operating parameters including said at least one of inspecting modifying, verifying, controlling, monitoring, or setting, wherein said user device enables said compressor operating parameters to be managed by a remote user utilizing the user device and situated at a location remote from said compressor, and wherein said control unit enables a local user situated in proximity to compressor to intervene in compressor management by utilizing the control unit hardwired to the compressor age said con pressor operating parameters without using said user device and wireless coupling unit at a moment when a network connection to the wireless coupling unit is unavailable, wherein the control unit is configured to take over operation of the compressor from the user device responsive to an instruction being received at the control unit, and wherein the user device is configured to take over operation of the compressor from the control unit responsive to an instruction being received at the user device, the computer-implemented method comprising steps of:

when a network connection to the wireless coupling unit is available, using said user device to manage said compressor wirelessly through the wireless coupling unit, and when a network connection to the wireless coupling unit is unavailable, managing the compressor directly through said control unit that is hardwired to the compressor without using said user device and wireless coupling unit, when an instruction is received by the control unit, taking over control of the compressor by the control unit, when an instruction is received by the user device, taking over control of the compressor by the user device, when the compressor is connected to a pneumatic network comprising one or more pneumatic consumers, detecting when one or more pneumatic consumers are inactive for an inactive time period, recording a compressor energy consumption during the inactive time period; determining a severity of a leakage in the pneumatic network based on energy consumption during the inactive time period, and determining the severity of the leakage based on a measure of the energy consumption and a length of the inactive time period, a number of the one or more pneumatic consumers, and a size and area of the pneumatic network defined by the one or more pneumatic consumers, wherein at least one of the severity of the leakage or the energy consumption over the pneumatic network is configured to be reported on a display connected to at least one of the user device and the control unit.

8. The computer-implemented method according to claim 7, wherein the inactive time period is a recurring time period derived from a compressor consumer profile.

9. The computer-implemented method according to claim 7, wherein the inactive time period is detected by a start or stop time entered by the user.

10. The computer-implemented method according to claim 7, wherein the method further includes the steps of:

making a sound recording in a compressor environment through a microphone of the user device, determining a belt tension of a compressor drive belt on the basis of the sound recording; and reporting the belt tension.

11. The computer-implemented method according to claim 10, wherein the method further comprises the steps of:

determining if the belt tension falls within a predefined operating area of the compressor, and reporting when the belt tension is outside the operating area.

12. The computer-implemented method according to claim 7, the method further comprising the steps of:

detecting an irregularity of the compressor based on the operating parameters; and reporting the irregularity.

13. The computer-implemented method according to claim 12, the reporting further comprising at least one of the following:

reporting a service on the basis of the irregularity detected;

reporting a list of replacement parts based on the irregularity detected; and reporting a service interval based on the irregularity detected.

14. The computer-implemented method according to claim 7, the method further comprising at least one of the steps of:

consulting a compressor energy consumption for an active time period;

consulting a compressor parts list;

consulting a compressor instruction or maintenance guide; and consulting an identification of a compressor manifold.

15. A computer-readable means of storage containing a computer program product to execute the method of claim 7.

16. The computer-implemented method according to claim 7, wherein the communication takes place on the basis of a unique serial number of the compressor together with a code specified by a compressor manufacturer in order for the user device to access the wireless coupling unit in order to manage the compressor.

* * * * *